Sept. 10, 1957  F. N. KOONTZ ET AL  2,806,117
INDUCTOR APPARATUS
Filed Dec. 7, 1953

WITNESSES
Edwin E. Bassler
K. G. Brodahl

INVENTORS
Franklin N. Koontz &
Marcus Weitz
BY F. E. Browder
ATTORNEY

United States Patent Office 2,806,117
Patented Sept. 10, 1957

2,806,117

INDUCTOR APPARATUS

Franklin N. Koontz and Marcus Weitz, Baltimore, Md., assignors to Westinghouse Electric Corporation, East Pittsburgh, Pa., a corporation of Pennsylvania Application December 7, 1953, Serial No. 396,629

9 Claims. (Cl. 219—10.79)

This invention relates to apparatus for the heat treatment of metallic workpieces, and more particularly to inductor apparatus for such heat treatment.

It is an object of this invention to provide an improved inductor apparatus for the heat treatment of workpieces.

It is another object of this invention to provide an inductor member for either the internal or the external heat treatment of a suitable workpiece, which inductor member is axially adjustable as may be desired.

It is a further object to provide an electrically improved multiple turn inductor apparatus having a uniform and controlled spacing of the inductor turns.

It is an additional object to provide an inductor apparatus having an improved support arrangement.

It is a different object of the invention to provide heat-treating apparatus having an improved insulation arrangement and more accurately spaced plurality of turns.

It is still another object to provide particularly a helical inductor member having an adjustable pitch which can be readily and accurately changed as may be desired, such that the pitch of the inductor member is the same for the whole length of the inductor member or may be different for various portions of the inductor member.

It is a still further object of the invention to provide an adjustable inductor member or coil which requires no brazed tabs or like members, as required by the prior art inductor members, to cause undesirable electrical losses and arc-overs which result in burning out the inductor member.

It is a still additional object to provide an inductor assembly comprising an inductor member and a plurality of supports therefor with the support so provided that removal and replacements of the inductor member may be readily accomplished, as desired, with the removal of but one or a minimum of the supports.

In accordance with the invention, an inductor member of a helical shape or any other shape having a plurality such as two or more turns is provided between one or more support members such that the spacing between adjacent turns of said inductor member in a direction substantially parallel to the axis of the inductor member can be changed, as desired, to provide either a uniform pitch throughout the length of the inductor member or a variable pitch which changes for the various portions of that inductor member, as may be desired, depending upon the eventual heat treatment pattern to be obtained or the shape and density of the workpiece to be heat treated. The support members are preferably made of electrically insulating material and have a plurality of spacer members carried or supported by each support member. One of said spacer members is provided to be positioned between each pair of adjacent turns in the inductor member. In this way, the spacer members can be made of flexible or plastic insulating material, such that the spacer members can be readily moved in position along the support members or removed from the respective support members and larger or smaller spacer members substituted therefore to change the pitch of the respective turns in the inductor member, without the necessity of any substantial change in the position of the inductor member relative to the respective support members. In this way, the spacer members provide an electrically insulating support to rigidly position the turns of the inductor member, as desired, and further to provide the desired spacing between the respective turns of the inductor member. It is to be understood in this respect that the inductor member or coil may have any reasonable number of turns, and the cross section of the respective turns when considered in a plane parallel to the axis of the inductor member may be round in shape, or square or rectangular, or have any other suitable cross-sectional shape, as may be desired, to effect the desired heat treatment of the workpieces under consideration.

These and other objects of the invention are effected as will be apparent from the following description, taken in accordance with the accompanying drawing which forms a part of this application and in which.

Figure 1:
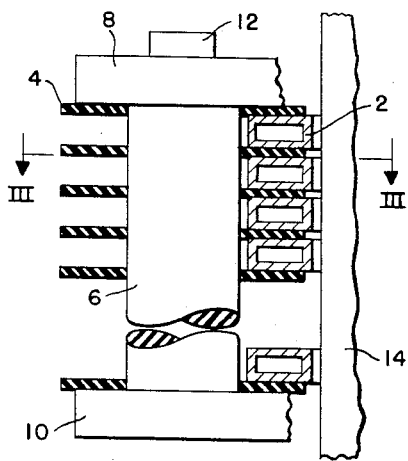
Figure 1 is a cross-sectional view of one embodiment of the invention showing a portion of an inductor member held in position by a support member, and a plurality of spacer members in accordance with our invention.

In Fig. 1, there is shown an inductor member 2 having a plurality of turns, which turns are shown to be rectangular in shape and made in the form of a hollow conductor, such that a suitable cooling material can be passed through the inductor member as may be desired for the purpose of cooling the inductor coil. A plurality of spacer members 4 made of insulating material are shown positioned between the respectively adjacent turns of the inductor coil 2, such that the spacing between the turns is determined by the spacer members 4 and further such that the inductor member 2 is held in position by the spacer members 4. The spacer members 4 are carried or supported by a support member or post 6 made of electrically insulating material, such as Micarta or the like, which support member 6 is held in position between an upper end plate 8 and a lower end plate 10 by means of a suitable fastener member 12. The fastener member 12 may be in the form of a tension fastener, such as a threaded bolt or the like. Further, the fastener member 12 may be made of electrically insulating material if desired. A workpiece 14 is shown positioned relative to the inductor coil 2 to give a more complete picture and description of the applicants' invention. It is considered to be understood and well known in the art how the workpiece 14 can be held in fixed relationship relative to the inductor 2 and support member 6 for the heat treatment of the workpiece as desired, and further how the workpiece 14 can be moved or scanned relative to the inductor member 2 if desired; accordingly, these features are not specifically shown by the drawing.

Figure 2:
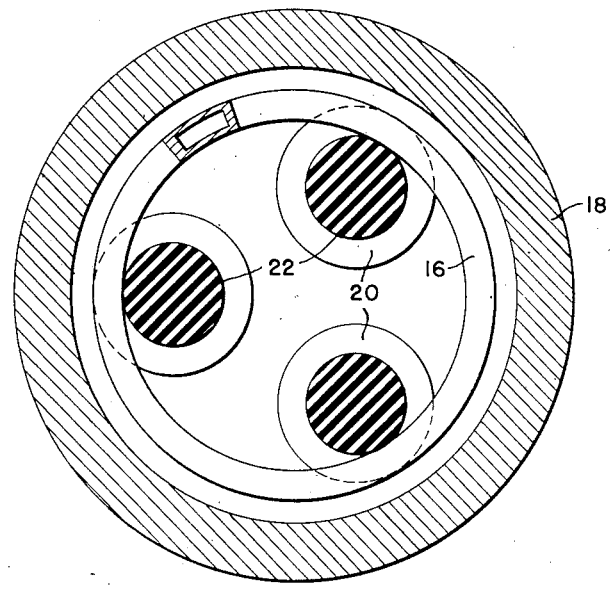
Fig. 2 is a top sectional view of another embodiment of the invention showing an inductor member held in position by three support members, with each of the support members having spacer members to position the inductor coil.

In Fig. 2 of the drawing, there is shown a top or plan view of one modification of the inductor apparatus in accordance with our invention, showing an inductor coil 16 suitable for the heat treatment of the internal surface of a tubular shaped workpiece 18. It is to be understood that the inductor coil 16 may be of a helical shape, similar to the inductor coil or member 2 shown in Fig. 1, or may have any other suitable shape, such as conical, square, rectangular, oval, oblong or the like, as may be necessary for the satisfactory and efficient heat treatment of the workpiece or workpieces under consideration. Further, our invention is applicable to stationary or the scansion heat treatment of workpieces. The inductor member or coil 16 is held in position by a plurality of spacer members 20 which in the illustration of Fig. 2 are triangularly positioned relative to the axis of the workpiece 18 and the axis of the inductor member 16 and are three in number. Each of the spacer members 20 is supported by a support member or post 22, with three of such support posts or members 22 being shown in Fig. 2 positioned at 120° intervals relative to the axis of the workpiece 18 and the axis of the inductor coil 16, as shown in Fig. 2. In this respect, it is to be understood that any desired number of the support posts 22 may be employed in accordance with the teachings of our invention, with said number of support members 22 being determined by the practical necessities of the particular heat-treatment operation under consideration.

Figure 3:
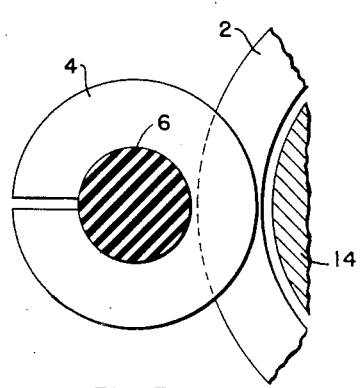
Fig. 3 is a cross-sectional view of a portion of the apparatus shown in Fig. 1 taken along the line III—III as shown in Fig. 1.

In Fig. 3, there is shown a partial schematic view taken along line III—III of Fig. 1, with a support post 6 being shown as carrying or supporting a spacer member 4 relative to an inductor member or coil 2. A workpiece 14 is shown in accordance with our invention. The spacer members may be all of the same relative thickness such that the respective turns of the inductor coil or member have the same relative pitch, or selected ones of the spacer members may be of different size or thickness to rearrange the spacing of the turns of the inductor coil to have a different pitch for preselected portions of the inductor coil when considered in a direction substantially parallel to the axis of the inductor coil. The latter inductor coil having differing pitches may be used for the purpose of varying the electromagnetic field density along the length of a workpiece to be heat treated, or for varying the uniformity of the heat treatment along the length of the workpiece, as may be desired. It is to be understood that the workpiece may be stationary in position relative to the inductor coil, or may be scanned or moved in a direction substantially parallel to the axis of the inductor coil, as may be desired for the particular heat-treatment operation under consideration.

While we have shown our invention in particularly one form only, it will be obvious to those skilled in the art that it is not so limited but is susceptible of various changes and modifications without departing from the spirit thereof.

We claim as our invention:

1. In apparatus providing a workpath for heat treating a workpiece, the combination of an inductor member having an axis substantially parallel to said workpath and including a plurality of adjacently positioned turns, a support member for said inductor member, said support member extending in a direction substantially parallel to said axis, and a spacer member having a first portion and a second portion, with said first portion being connected to said support member, and with said second portion being positioned between an adjacent pair of said turns for axially spacing the latter said turns.

2. In apparatus for heat treating a workpiece, the combination of an inductor member having an axis defining a workpath for said workpiece and including a plurality of adjacently positioned turns, a support member for said inductor member, with said support member extending in a direction substantially parallel to the axis of said inductor member, and a spacer member fastened to said support member and adjustable along the latter support member, said spacer member being positioned between an adjacent pair of said turns for spacing the latter said turns in a direction substantially parallel to said axis.

3. In workpiece heat-treating apparatus, the combination of an inductor member having an axis and a plurality of adjacently positioned turns, with said axis defining a heat treating position for said workpiece, a support for said inductor member, and a plurality of individual spacer members carried by said support, with one of said spacer members being positioned between each pair of adjacently positioned turns of said inductor member, and with each of said spacer members being separately removable from said support and said inductor.

4. The apparatus of claim 3 with each of the spacer members being made of electrically insulating material.

5. In workpiece heat-treating apparatus providing a workpath, the combination of an inductor member having an axis and a plurality of adjacently positioned turns, with said axis substantially parallel to said workpath, a support member for said inductor member, and a plurality of spacer members carried by said support member, with each of said spacer members having an axis and with the support member having an axis, with the support member carrying the spacer members in a substantially coaxial relationship relative to the axis of the support member.

6. The apparatus of claim 5 characterized by the axis of each spacer member being positioned substantially parallel to the axis of the inductor member.

7. In workpiece heat-treating apparatus, the combination of an adjustable inductor member having an axis and a plurality of adjacently positioned turns defining a workpath for said workpiece substantially parallel to said axis, a support member for said inductor member, said support member having an axis which is substantially parallel to the axis of the inductor member, and a plurality of spacer members carried by said support member and being movable along the support member, with each of said spacer members being positioned between an adjacent pair of said inductor member turns such that the spacer members are movable along the axis of the support member to thereby determine the spacing between respectively adjacent pairs of said inductor member turns when considered in a direction substantially parallel to the inductor member axis.

8. In workpiece heat-treating apparatus, the combination of an inductor member having an axis and a plurality of adjacently positioned turns with said axis defining a heat-treating position for said workpiece, a plurality of support members for said inductor member, and a plurality of spacer members carried by each of said support members, with one of said spacer members being positioned between each pair of adjacently positioned turns of said inductor member.

9. The apparatus of claim 8 characterized by each of the spacer members being made of flexible and electrically insulating material such that each spacer member can be removed from its respective support member by flexing the spacer member.

References Cited in the file of this patent

UNITED STATES PATENTS

| | | |
|---|---|---|
| 2,202,758 | Denneen et al. | May 28, 1940 |
| 2,225,855 | Brown | Dec. 24, 1940 |
| 2,252,919 | Eckard | Aug. 19, 1941 |
| 2,588,406 | Munson | Mar. 11, 1952 |
| 2,716,695 | Cutliff et al. | Aug. 30, 1955 |

FOREIGN PATENTS

| | | |
|---|---|---|
| 526,175 | Germany | Mar. 23, 1927 |